(12) United States Patent
Liu et al.

(10) Patent No.: US 10,477,837 B1
(45) Date of Patent: Nov. 19, 2019

(54) CAT ACTIVITY TOY

(71) Applicant: Radio Systems Corporation, Knoxville, TN (US)

(72) Inventors: Brian Liu, Shenzhen (CN); Amanda Sweetnam, Midlothian, VA (US); Baker Zhong, Shenzhen (CN)

( * ) Notice: Subject to any disclaimer, the term of this patent is extended or adjusted under 35 U.S.C. 154(b) by 787 days.

(21) Appl. No.: 15/017,134

(22) Filed: Feb. 5, 2016

Related U.S. Application Data

(60) Provisional application No. 62/113,084, filed on Feb. 6, 2015.

(51) Int. Cl.
*A01K 15/02* (2006.01)

(52) U.S. Cl.
CPC .................................. *A01K 15/025* (2013.01)

(58) Field of Classification Search
CPC ...... A01K 15/00; A01K 15/02; A01K 15/021; A01K 15/024; A01K 15/025
USPC .................................................. 119/706, 707
See application file for complete search history.

(56) References Cited

U.S. PATENT DOCUMENTS

| | | | |
|---|---|---|---|
| 1,534,964 | A | 4/1925 | Kahnweiler |
| 3,400,703 | A | 9/1968 | Rhodes |
| 3,511,225 | A | 5/1970 | Gunpei |
| 3,611,996 | A | 10/1971 | Wegner |
| 3,640,263 | A | 2/1972 | Rhodes |
| 3,665,892 | A | 5/1972 | Kusisto |
| 3,913,552 | A | 10/1975 | Yarur et al. |
| 4,094,294 | A | 6/1978 | Speer |
| 4,168,695 | A | 9/1979 | Haller et al. |
| 4,185,608 | A | 1/1980 | Young et al. |
| 4,209,003 | A | 6/1980 | Sainsbury |
| 4,237,851 | A | 12/1980 | Haller |
| 4,267,799 | A | 5/1981 | Bacon |
| 4,323,047 | A | 4/1982 | McIntosh et al. |
| 4,368,885 | A | 1/1983 | Katada et al. |
| 4,409,953 | A | 10/1983 | Kennedy et al. |
| 4,534,316 | A | 8/1985 | Bowlsby |

(Continued)

FOREIGN PATENT DOCUMENTS

| | | | |
|---|---|---|---|
| CA | 2920549 A1 | * 8/2016 | ........... A01K 15/025 |
| CN | 201234507 | 5/2009 | |

(Continued)

OTHER PUBLICATIONS

Liu, Brian, co-pending Design U.S. Appl. No. 29/523,407, filed Apr. 9, 2015.

(Continued)

*Primary Examiner* — Monica L Williams
*Assistant Examiner* — Aaron M Rodziwicz
(74) *Attorney, Agent, or Firm* — Baker, Donelson, Bearman, Caldwell & Berkowitz PC

(57) ABSTRACT

An interactive cat toy having a passageway holding an object of prey movable in response to a motor between a recessed position within the housing and an extended position outwardly of the housing; and a switch for selectively directing an electric current to flow to the motor, the movement of the object of prey, attracting the attention of a cat, provides physical and mental exercise and activity for the cat. A method is disclosed for moving the object of prey within the passage between the recessed position in the housing and the extended position outwardly of the housing for entertaining and exercise of the cat.

23 Claims, 5 Drawing Sheets

(56) References Cited

U.S. PATENT DOCUMENTS

| | | | |
|---|---|---|---|
| 4,579,100 A | 4/1986 | Whitaker | |
| 4,579,340 A | 4/1986 | Jenkins et al. | |
| 4,583,514 A | 4/1986 | Nozato | |
| 4,721,091 A | 1/1988 | Ridley et al. | |
| 4,722,299 A | 2/1988 | Mohr | |
| 4,803,953 A * | 2/1989 | Graves | A01K 15/025 119/707 |
| 4,834,060 A | 5/1989 | Greene | |
| 4,907,540 A | 3/1990 | Reynolds | |
| 4,926,796 A | 5/1990 | Leopold | |
| 4,930,448 A | 6/1990 | Robinson | |
| 4,940,018 A | 7/1990 | Edling | |
| 4,995,374 A | 2/1991 | Black | |
| 5,103,770 A | 4/1992 | Berkovich | |
| 5,111,771 A | 5/1992 | Mathews | |
| D335,553 S | 5/1993 | Conner | |
| D336,033 S | 6/1993 | Welsh | |
| 5,265,583 A | 11/1993 | Otto | |
| 5,269,261 A | 12/1993 | McCance | |
| D345,633 S | 3/1994 | McCance | |
| 5,390,629 A | 2/1995 | Simone | |
| 5,413,085 A | 5/1995 | Kraeft | |
| 5,443,036 A | 8/1995 | Amiss et al. | |
| 5,517,948 A | 5/1996 | Udelle et al. | |
| 5,529,017 A | 6/1996 | Udelle et al. | |
| 5,540,187 A * | 7/1996 | Udelle | A01K 15/025 119/706 |
| 5,572,955 A | 11/1996 | Boshears | |
| 5,575,482 A | 11/1996 | Butler, Jr. | |
| 5,579,725 A * | 12/1996 | Boshears | A01K 15/025 119/706 |
| 5,592,901 A | 1/1997 | Birmingham | |
| 5,619,953 A | 4/1997 | Griffin | |
| 5,634,435 A | 6/1997 | Udelle et al. | |
| 5,657,721 A | 8/1997 | Mayfield et al. | |
| 5,749,797 A | 5/1998 | Sunseri et al. | |
| 5,775,263 A | 7/1998 | Richards | |
| 5,806,465 A | 9/1998 | Baiera et al. | |
| 5,857,451 A | 1/1999 | Ciluffo et al. | |
| D405,563 S | 2/1999 | Baiera et al. | |
| 5,875,736 A * | 3/1999 | Udelle | A01K 15/025 119/706 |
| 5,881,679 A | 3/1999 | Hann | |
| 5,934,223 A | 8/1999 | Ellery-Guy | |
| D414,903 S | 10/1999 | Balera | |
| 6,058,887 A | 5/2000 | Silverman | |
| D427,260 S | 6/2000 | Burr | |
| 6,159,112 A | 12/2000 | Ciluffo et al. | |
| 6,174,216 B1 | 1/2001 | Chianese | |
| 6,176,230 B1 | 1/2001 | Thompson | |
| 6,190,271 B1 | 2/2001 | Rappaport et al. | |
| 6,343,569 B1 | 2/2002 | Buendiger | |
| 6,353,168 B1 | 3/2002 | Sosoka, Jr. et al. | |
| 6,360,694 B1 | 3/2002 | Noto | |
| 6,459,955 B1 | 10/2002 | Bartsch et al. | |
| 6,505,576 B2 | 1/2003 | Nathanson et al. | |
| 6,510,817 B2 | 1/2003 | Horvath | |
| 6,550,426 B2 | 4/2003 | Tsengas | |
| 6,557,495 B2 | 5/2003 | Lorenz | |
| 6,568,353 B2 | 5/2003 | Van Sluis | |
| 6,571,742 B1 | 6/2003 | Tsengas | |
| 6,571,743 B1 | 6/2003 | Curry | |
| 6,591,785 B1 * | 7/2003 | Boshears | A01K 15/024 119/706 |
| 6,640,750 B2 | 11/2003 | Rowe et al. | |
| 6,651,591 B1 | 11/2003 | Chelen | |
| 6,679,239 B1 | 1/2004 | Shultz et al. | |
| 6,701,872 B1 | 3/2004 | Allen | |
| 6,732,724 B1 | 5/2004 | Paulson et al. | |
| 6,772,745 B2 | 8/2004 | McEachen et al. | |
| 6,817,351 B2 | 11/2004 | Keller et al. | |
| 6,843,241 B1 | 1/2005 | Newcomer | |
| 6,875,136 B2 | 4/2005 | Leal et al. | |
| 6,880,542 B1 | 4/2005 | Johndreau et al. | |
| 6,892,675 B1 | 5/2005 | Comerford | |
| 7,044,084 B2 | 5/2006 | Ritchey | |
| 7,066,780 B2 | 6/2006 | Jamison et al. | |
| 7,111,620 B2 | 9/2006 | Johndreau et al. | |
| 7,114,465 B1 | 10/2006 | Winter | |
| 7,237,546 B2 | 7/2007 | Nozato | |
| 7,263,953 B2 | 9/2007 | Krishnamurthy et al. | |
| 7,278,934 B2 | 10/2007 | McBride et al. | |
| 7,328,671 B2 | 2/2008 | Kates | |
| 7,334,541 B2 | 2/2008 | Reiter | |
| 7,350,515 B2 | 4/2008 | Yao et al. | |
| 7,445,003 B2 | 11/2008 | Smith | |
| 7,520,818 B2 | 4/2009 | Winchester | |
| 7,631,617 B1 * | 12/2009 | Tsengas | A01K 15/025 119/707 |
| 7,691,012 B2 | 4/2010 | Cucjen et al. | |
| 7,712,909 B2 | 5/2010 | Nobayashi | |
| 7,762,213 B2 | 7/2010 | Cook et al. | |
| 7,766,770 B2 | 8/2010 | Cucjen et al. | |
| 7,806,087 B2 | 10/2010 | Plante | |
| 7,823,571 B2 | 11/2010 | Williamson et al. | |
| 7,823,574 B2 | 11/2010 | Chu | |
| 7,977,230 B2 | 7/2011 | Appel | |
| 7,997,230 B2 | 8/2011 | Cook et al. | |
| 8,011,326 B2 | 9/2011 | Del Pinal et al. | |
| D646,443 S | 10/2011 | Cook et al. | |
| 8,028,659 B2 | 10/2011 | Cook et al. | |
| 8,074,633 B2 | 12/2011 | Grant et al. | |
| 8,104,458 B2 | 1/2012 | Hoffman | |
| 8,109,239 B1 * | 2/2012 | Smestad | A01K 15/025 119/702 |
| D656,282 S | 3/2012 | Dixon et al. | |
| 8,161,908 B2 | 4/2012 | Cook et al. | |
| D659,305 S | 5/2012 | Song et al. | |
| D659,915 S | 5/2012 | Letchford | |
| 8,166,918 B2 | 5/2012 | Cook et al. | |
| 8,166,919 B2 | 5/2012 | Cook et al. | |
| 8,166,920 B2 | 5/2012 | Cook et al. | |
| 8,225,750 B2 | 7/2012 | Newman | |
| 8,287,404 B2 | 10/2012 | Cucjen et al. | |
| 8,328,368 B2 | 12/2012 | Luciano | |
| 8,347,823 B1 | 1/2013 | Thomas et al. | |
| 8,371,249 B1 | 2/2013 | Little | |
| 8,393,299 B1 | 3/2013 | Bernat | |
| 8,393,300 B2 | 3/2013 | Markham et al. | |
| 8,414,350 B2 | 4/2013 | Rehkemper et al. | |
| 8,418,681 B2 | 4/2013 | Levin et al. | |
| 8,517,003 B2 | 8/2013 | Fisher | |
| 8,522,725 B1 | 9/2013 | Moore | |
| 8,550,063 B2 | 10/2013 | Alger | |
| 8,640,653 B2 | 2/2014 | Cook et al. | |
| 8,789,986 B2 | 7/2014 | Li | |
| 8,807,089 B2 | 8/2014 | Brown et al. | |
| 8,893,698 B2 | 11/2014 | Boehner | |
| 8,926,137 B2 | 1/2015 | Li | |
| 8,932,156 B2 | 1/2015 | Boehner | |
| 8,944,006 B2 | 2/2015 | Anderson et al. | |
| 8,944,011 B2 | 2/2015 | Kirschbaum | |
| D724,795 S | 3/2015 | Cook et al. | |
| D725,795 S | 3/2015 | Cook et al. | |
| 9,022,016 B1 | 5/2015 | Hafer et al. | |
| D748,349 S | 1/2016 | Hussey et al. | |
| 9,320,960 B1 | 4/2016 | Ward | |
| 9,371,973 B2 | 6/2016 | Li | |
| D794,878 S | 8/2017 | Hussey et al. | |
| 9,730,428 B1 * | 8/2017 | Kreischer | A01K 15/025 |
| D797,385 S | 9/2017 | Hamill et al. | |
| 9,943,070 B1 | 4/2018 | Allen et al. | |
| 2001/0003942 A1 | 6/2001 | Yabushita et al. | |
| 2001/0037773 A1 | 11/2001 | Nathanson et al. | |
| 2002/0002955 A1 | 1/2002 | Lorenz | |
| 2003/0150398 A1 | 8/2003 | Nathanson et al. | |
| 2005/0056033 A1 | 3/2005 | Gingras | |
| 2005/0224003 A1 | 10/2005 | Yin et al. | |
| 2006/0150918 A1 | 7/2006 | Rowe | |
| 2006/0213453 A1 | 9/2006 | Conrady | |
| 2006/0219187 A1 | 10/2006 | Krishnamurthy et al. | |
| 2007/0289550 A1 | 12/2007 | Huang | |
| 2008/0011243 A1 | 1/2008 | Moulton | |

(56) References Cited

U.S. PATENT DOCUMENTS

| | | | |
|---|---|---|---|
| 2008/0236511 A1* | 10/2008 | Boelke | A01K 15/021 119/707 |
| 2010/0079999 A1 | 4/2010 | Schnuckle | |
| 2010/0089329 A1* | 4/2010 | Lefferson | A01K 1/0209 119/51.02 |
| 2011/0265728 A1 | 11/2011 | Cook et al. | |
| 2011/0303208 A1 | 12/2011 | Taylor | |
| 2012/0097114 A1 | 4/2012 | Scott | |
| 2012/0134157 A1 | 5/2012 | Li | |
| 2012/0234258 A1 | 9/2012 | Cook et al. | |
| 2012/0298049 A1 | 11/2012 | Cook et al. | |
| 2013/0081577 A1 | 4/2013 | Morris | |
| 2013/0228138 A1 | 9/2013 | Hamill et al. | |
| 2014/0283757 A1 | 9/2014 | Davison, III et al. | |
| 2015/0036348 A1 | 2/2015 | Dong et al. | |
| 2015/0321059 A1 | 11/2015 | Hussey et al. | |
| 2016/0242388 A1* | 8/2016 | Chiou | A01K 15/024 |

FOREIGN PATENT DOCUMENTS

| | | |
|---|---|---|
| CN | 303650345 | 4/2016 |
| EM | EU002594101-0001 | 1/2015 |
| JP | 2002176873 A | 6/2002 |
| KR | 20130027393 A | 3/2013 |
| KR | 20140092530 A | 7/2014 |

OTHER PUBLICATIONS

Pounce cat toy; petsafe.net; dated Aug. 28, 2015.
Web page from www.frolicat.com for "Bolt" toy printed May 13, 2013 (3 pages).
Web page from www.frolicat.com for "Dart" toy printed May 13, 2013 (3 pages).
Web page www.frolicat.com for "Sway" toy printed May 13, 2013 (3 pages).
Web page www.frolicat.com for "Twitch" toy printed May 13, 2013 (3 pages).
On-line product available from www.amazon.com called Ethical Pet Mouse Chase Electronic Cat Toy (printed Jun. 15, 2013).
Australian Patent Examiner's First Report on Patent Application No. 2009305576 dated Jul. 26, 2013, 3 pages.
English Translation for Japanese office action Application No. JP2011532303, dated Feb. 4, 2014, 5 pages.
Extended European Search Report for Application No. EP15866103 dated May 11, 2018, 8 pages.
Fetch-N-Treat website, http://tug-e-nuff.co.uk/fetch-n-treat.html, accessed on Feb. 29, 2016, 2 pages.
GoDogGo website, www.godoggoinc.com/products/godog-gofetchmachine.html, accessed on Feb. 29, 2016, 4 pages.
iFetch Shop website, http://shop.goifetch.com/product-p/ifetch-too.htm, accessed on Feb. 29, 2016, 4 pages.
International Preliminary Report on Patentability for Application No. PCT/US2015/061296 dated Jun. 6, 2017, 8 pages.
International Search Report and Written Opinion for Application No. PCT/US2015/061296 dated Feb. 29, 2016, 10 pages.
PetSafe, http://www.petsafe.net/, accessed on Mar. 22, 2016, 2 pages.
International Search Report and Written Opinion for Application No. PCT/US2018/044698 dated Sep. 26, 2018, 8 pages.
Website for http://goifetch.com, printed Oct. 13, 2014, published Jan. 1, 2013, 1 page.
Website for www.godoggoinc.com, printed Oct. 13, 2014, published Jan. 1, 2008, 3 pages.
Youtube, https://www.youtube.com/watch?v=RiodBs283-E, posted on Apr. 27, 2016, 1 page.

* cited by examiner

CAT ACTIVITY TOY

CROSS REFERENCE TO RELATED APPLICATIONS

The present application claims benefit of U.S. Provisional Patent Application Ser. 62/113,084, filed Feb. 6, 2015, which application is incorporated by reference in its entirety as if fully set forth herein.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of animal entertainment devices. More particularly, the invention relates to a novel mechanized device that creates interest and provides exercise for a feline.

TECHNOLOGY IN THE FIELD OF THE INVENTION

Various devices for promoting interactive play with a cat are known. The most effective of such toys enhance the instinctive predatory behavior in the feline. However, if the reaction of the toy becomes predictable, the pet's attention will diminish over time and the cat gets less exercise and enjoyment.

Veterinarians recommend that cats get at least 10 to 15 minutes of play or exercise per day. A toy that provides various intervals to keep the cat physically and mentally occupied enhances the cat's exercise and decreases the occurrence of separation anxiety from the owner.

Known automated pet toy dispensers, such as ball launchers, are designed to dispense single toy shapes in one direction. These devices can only dispense on command or timed period, and not in a multiple direction trajectory.

A need exists for a periodic, random or timed multi-faced activity toy that can quickly extend and retract multiple "prey" shapes, thereby providing a cat with the exercise and entertainment that it needs. A need further exists for a toy that, in one embodiment, will extend and retract an object from a housing in any direction in relation to the surface of the unique housing.

It is to such need in the art that the present invention is directed.

BRIEF SUMMARY OF THE INVENTION

The present invention meets the need in the art by providing an interactive cat toy, comprising a housing fabricated from a durable material, the housing have at least one opening for a passageway to a respective side of the housing with an object of prey associated with each of the openings, the objects of prey dimensioned to be received within the passageway for moving relative to a respective opening. A motor operatively coupled to the object of prey and communicating with a supply of electrical current, for moving the object of prey between a recessed position within the housing and an extended position outwardly of the housing through the respective opening. A switch for selectively directing the electric current to flow from the supply to the motor, whereby the motor, being operated, moves the object of prey relative to the opening.

In another aspect, the present invention provides a method of entertaining an animal, comprising the steps of:

disposing an object of prey within a passageway of a housing which passageway has a through opening in a side thereof;

linking a selectively operated motor to the object of prey; and operating the motor selectively to move the object of prey between a recessed position within the passage of the housing and an extended position through the opening outwardly of the housing, whereby the motor, being operated, moves the object of prey relative to the opening for attracting hunting attention of an animal while providing during operation thereof playful exercise and mental activity for the animal responding thereto.

Furtherly and more particularly described, the present invention meets the need in the art by providing provides an interactive cat toy.

The cat toy first includes a housing. The housing may have an aesthetically pleasing shape, such as, by illustration and not limitation, a block of cheese. The housing is fabricated from a durable material, such as a polycarbonate material.

The housing will have one or more openings in a side wall. Each through-opening communicates with a passage within the housing and is dimensioned to receive an object of prey.

The cat toy also includes an object of prey associated with each through-opening. The object of prey is an item of hunting interest and attractiveness for the cats, such as a food article, and preferably in the image of a mouse, but may be of another shape.

A motor operatively connected to the object of prey causes the object of prey to move between first position and a second position, which first position is a retracted position within the housing and which second position is an extended position with a portion of the object of prey outwardly of the housing, and in an alternate embodiment configured to move the object of prey to an intermediate position therebetween.

Objects, advantages, and features of the present invention will become apparent upon a reading of the following detailed description in conjunction with drawings.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

"Object of prey" is a body similar to, or simulating in appearance, an item, object, animal or article that is of hunting interest or attractiveness to a hunting animal such as a feline.

Description of Selected Specific Embodiments

Figure 1:
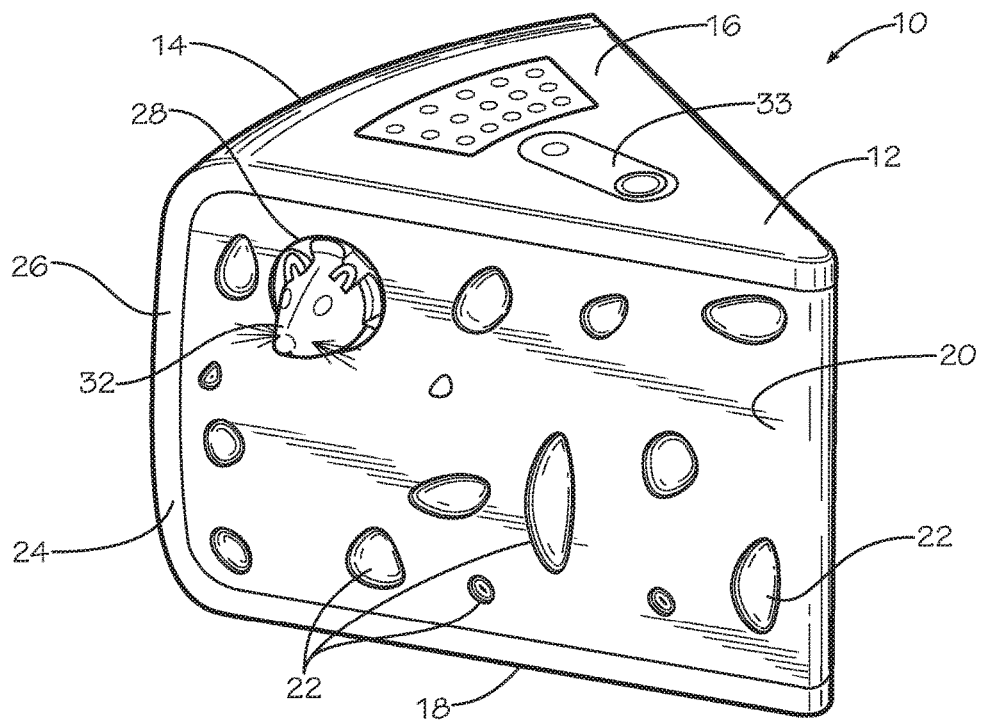
FIG. 1 illustrates in a perspective view an interactive cat toy of the present invention, in one embodiment. This view depicts a mouse as an object of prey extending through an opening in the housing.

With reference to the drawings in which like parts have like reference numerals for identification, FIG. 1 illustrates in a perspective view an interactive cat toy 10 of the present invention, in one embodiment. The cat toy 10 first includes a housing 12. The illustrative housing 12 is in the shape of a wedge of cheese. The housing 12 effects the appearance of the wedge of cheese with an arcuate back 14, opposing top and bottom surfaces 16 and 18, and opposing side walls 20. To sustain the appearance thereof as the wedge of cheese, the side walls in the illustrative embodiment include a plurality of recesses 22. However, other aesthetically pleasing or interesting shapes such as a block of cheese, a tube, a box, or other housing shape may be used.

The housing 12 is ideally fabricated from a polycarbonate material. However, the housing 12 may alternatively be fabricated from an elastomeric material, a metal material, or other durable material. Ideally, the housing 12 is light-weight and can be easily moved selectively from room to room by a person seeking to provide exercise and entertainment for an animal. The housing 12 may be assembled from opposing shells or members that define respective portions 24, 26 with matingly engagable open edges and holding the opposing side walls 20, to define an enclosing housing.

The cat toy 10 also includes at least one through-opening 28 in one of the side walls 20. The through opening 28 opens to a passage 30 (best illustrated in FIG. 2) within the housing 12. The through-opening 28 is dimensioned to receive an object of prey 32 therethrough. The object of prey 32 occupies the passage 30 and during operation of the cat toy 10 as discussed below moves longitudinally relative to the passage 30 through the opening 28. In the illustrative arrangement of FIG. 1, the object of prey 32 is configured with features of a mouse. The mouse is seen extending through the opening 28 in the housing 12.

Figure 2:
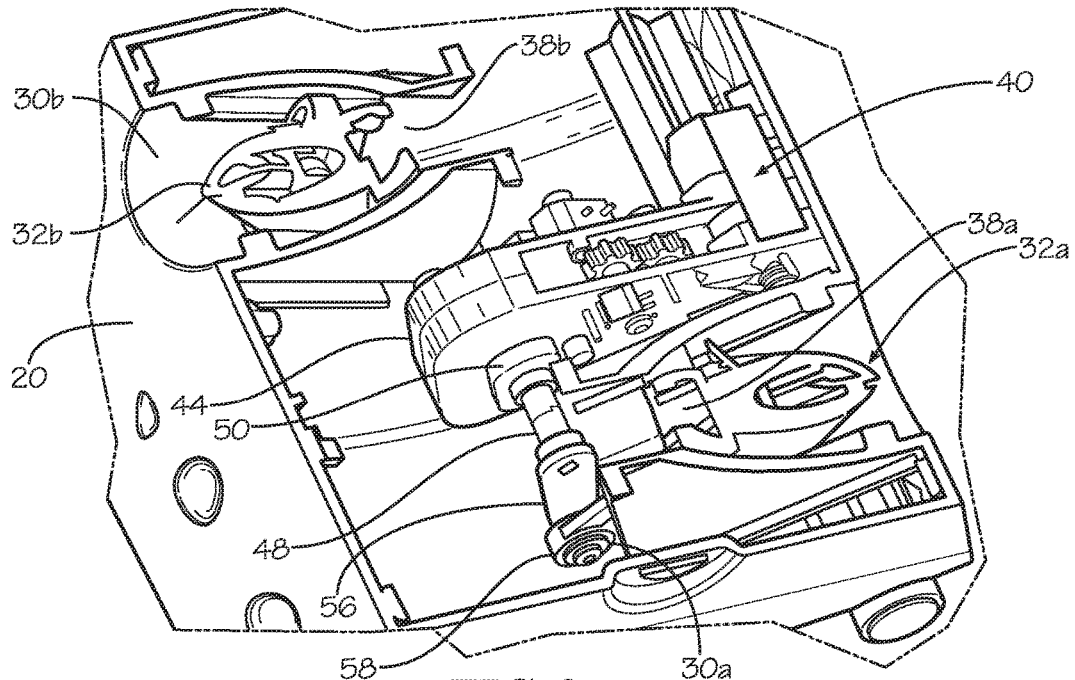
FIG. 2 illustrates in a cut-away perspective view a detail of the interactive cat toy of FIG. 1. This view depicts two objects of prey interconnected for operation of the cat toy in accordance with a method of entertaining an animal disclosed herein.

The cat toy 10 also has a power switch 33, which in the illustrated embodiment mounts to the top surface 16. The power switch 33 connects to a supply of electricity. In the illustrated embodiment, the supply of electricity is one or more batteries (shown schematically in FIG. 3 and in FIG. 7), that provide power to the electrical components within the housing 10. Such components include a motor 40, which is seen in FIG. 2. Alternatively or in addition, an AC power adapter may be provided to power the motor 40 and electrical components further discussed below. In an alternate embodiment, the power switch 33 may contain an illuminative lamp, such as a light emitting diode (LED) operated by an LED driver disposed within the housing 12. The lamp selectively may be constant on during operation of the cat toy 10 or alternatively, may flash and flicker, and may further change colors of illumination. Such illuminative lamp may further facilitate attracting the attention of a feline for play with the cat toy 10.

FIG. 2 illustrates in a cut-away perspective view an interior of the interactive cat toy 10. The illustrated embodiment includes a first object of prey 32a and a second object of prey 32b. As noted above, the illustrated embodiment employs as the object of prey 32 a body having appearance features of a mouse, and in operation of the cat toy 10, the object of prey simulates the actions of a mouse in making cautious egress from a safety place and darting retreat therein. The first mouse 32a occupies, and travels longitudinally in the passage 30a, to intermittently extend through the opening 28a on one side of the housing 12. The second mouse 32b occupies, and travels longitudinally in the passage 30b to intermittently extend through the opening 28b on the other side of the housing 12. Thus, this invention describes a device that is intended to allow for at least one "object of prey" with shaped appearance features of an item, object, animal, or article attractive to felines to be presented intermittently to the cat during operation of the cat toy 10. The illustrated embodiment disposes two movable objects of prey 32 each on a different side of the housing 12.

Figure 2A:
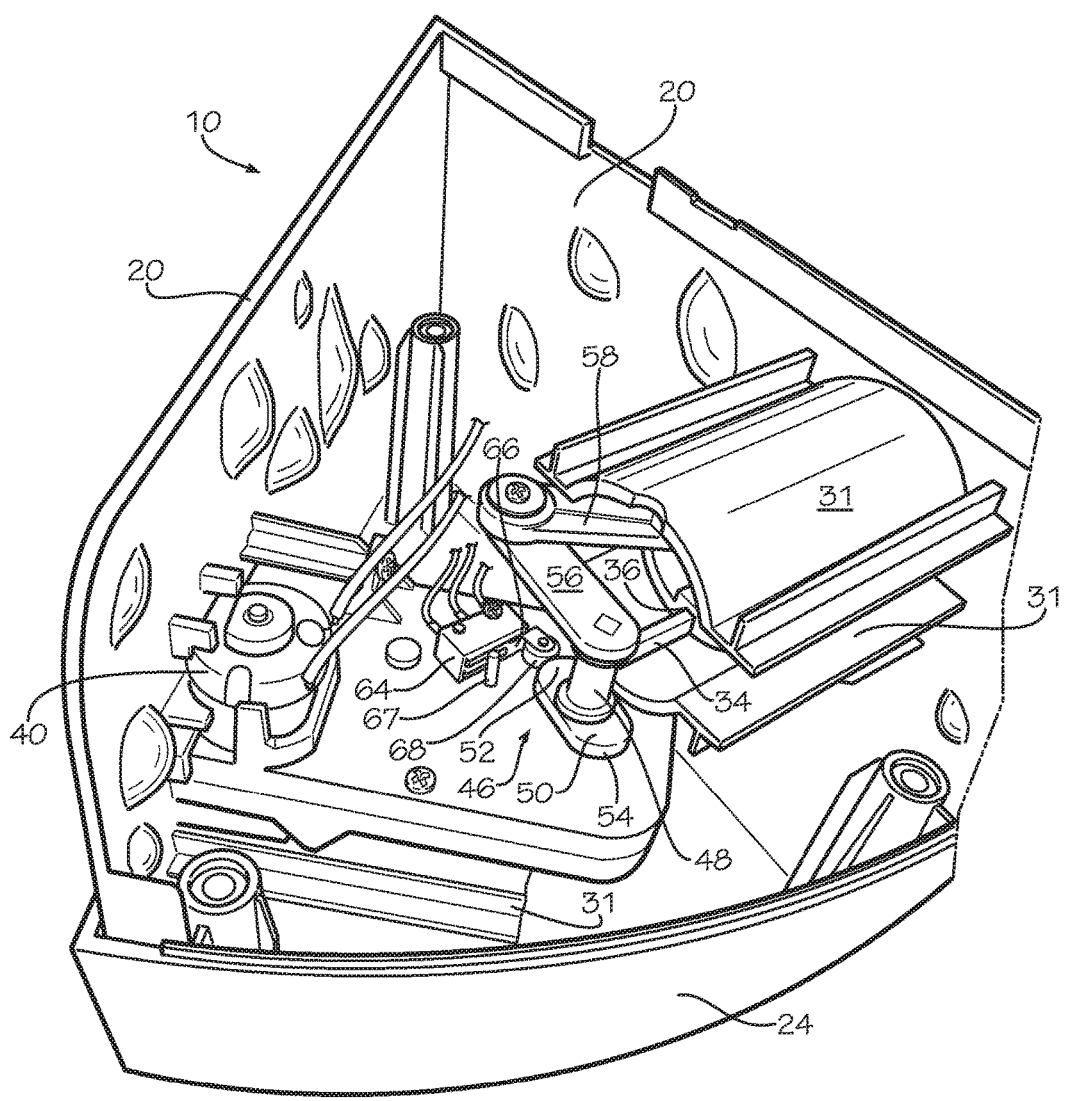
FIG. 2A illustrates in cut-away perspective view an interior detail of the interactive cat toy of FIG. 1. This view depicts a reciprocating linkage between a motor and an object of prey for movement of the object of prey from a first position within the housing to a second position disposing the object of prey exterior of the housing.
Figure 4:
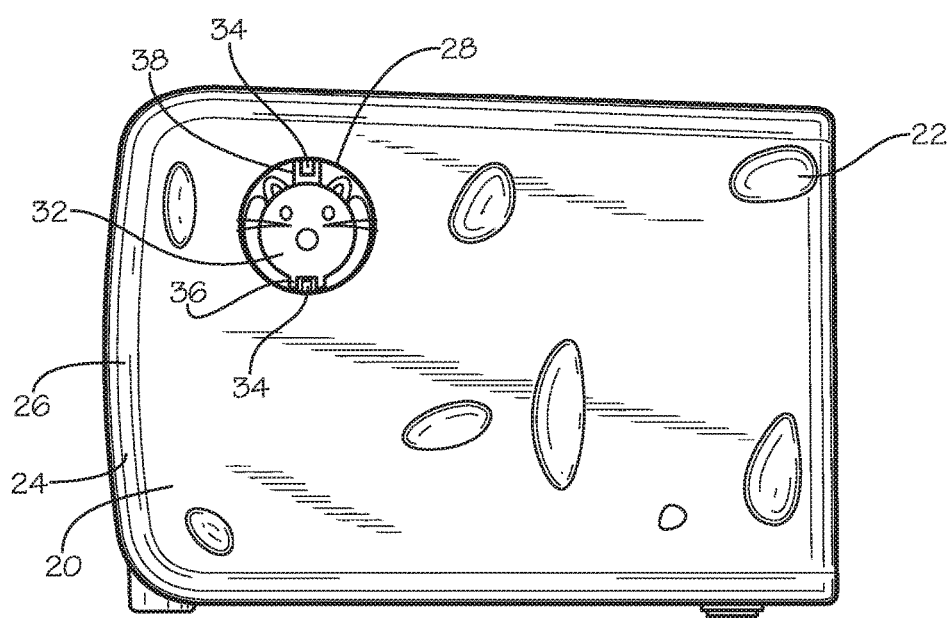
FIG. 4 illustrates in a side elevational view an embodiment of the interactive cat toy of the present invention. This view depicts a mouse as an object of prey extending through an opening in the housing.

FIG. 2A illustrates in cut-away perspective view an interior detail of the interactive cat toy 10. The housing 12 includes posts 29 that each receive threaded fasteners for engaging the respective portions 24, 26 together. Each passage 30 is defined by a pair of spaced-apart flanges 31 that in the illustrated embodiment have arcuate opposed portions. Opposing flanges 34 extend from an inner wall in the arcuate portions towards the opposing flange. The flanges 34 define guide tracks for movement of the object of prey 32. The object of prey 32 defines a first slot 36 in a lower surface and an opposing slot 38 in an upper surface. The slots 36, 38 cooperatively receive, and travel on, respective ones of the flanges 34, to guide the reciprocating movement of the object of prey 32 between the retracted position in the passage 30 within the housing 12 and the extended position with a portion of the object of prey 32 outwardly of the housing. The opposing flanges 34 and slots 36, 38 are also illustrated in FIG. 4 discussed below.

A motor 40 mounts in the housing 12 and a drive shaft of the motor receives a drive gear disposed in a geared transmission 44. (Wires 45 for conducting current to the motor from the battery and through the power switch are depicted in cut-off presentation.) The drive gear engages a driven gear. A crankshaft assembly 46 connects between the transmission 44 and the object of prey 32. The crankshaft assembly 46 includes a crankshaft 48 extending on an axle of the driven gear in the transmission 44. A plate 50 extends perpendicularly from the crankshaft 48 proximate the transmission 44. The plate 50 defines opposing distal ends 52, 54 remote from the crankshaft 48 and narrow portions 55 proximate the crankshaft 48. The distal ends 52, 54 define relatively high points while the narrow portions 55 define relatively low portions for camming action of the plate as discussed below. The corners of the plate 50 at the distal ends are preferably arcuate. An arm 56 connects to a distal end of the crankshaft 48. The arm 56 connects to, and extends laterally from, the crankshaft 48 at a perpendicular angle. A link member 58 pivotably connects to a distal end of the arm 56. An opposing end of the link member 58 pivotably attaches to a rear portion of the object of prey 32. Although not illustrated, a second crankshaft assembly 46 is disposed on an opposing side of the transmission 44. The second crankshaft assembly may not include the plate 50 but includes the crankshaft 48 that extends laterally from the opposing side of the transmission 44, and connects through the arm 56 and the link member 58 to the second of the objects of prey 32b, for longitudinal movement during operation of the cat toy 10.

In the illustrated embodiment, a snap-action switch 64 mounts to a side wall of the transmission 44. (Wires 65 for conducting current through the switch 64 to the processor 72 are depicted in cut-off presentation.) The switch 64 includes a spring-biased lever 66 with a roller 68 at a free distal end. The lever 66 pivots from a first position proximate the switch and a second position remote therefrom for operating the switch. The roller 68 aligns with a side edge of the plate 50. The roller 68 periodically contacts the edge of the plate 50, as the crankshaft 48 and plate 50 rotate. The arcuate corners of the distal ends 52, 54 of the plate 50 facilitate contact of the roller 68 on the edge of the plate. The edge of the plate 50 acts as a cam with the relatively high distal ends 52, 54 and the relatively low portions 55. The camming action causes the lever 66 to pivot between the remote position and the proximate position and thereby operate the switch 64. A stop pin 67 stops the lever from excessive movement away from the switch 64. The switch 64 causes a control circuit to momentarily stop the flow of electricity to the motor 40. This stops the movement of the object of prey 32 momentarily. The circuit then resumes the supply of power to the motor 40 to rotate the crankshaft 48. The rotation of the crankshaft 48 creates reciprocating movement of the object of prey 32 guided longitudinally by the flanges 34 in and out of the housing 12.

Figure 3:
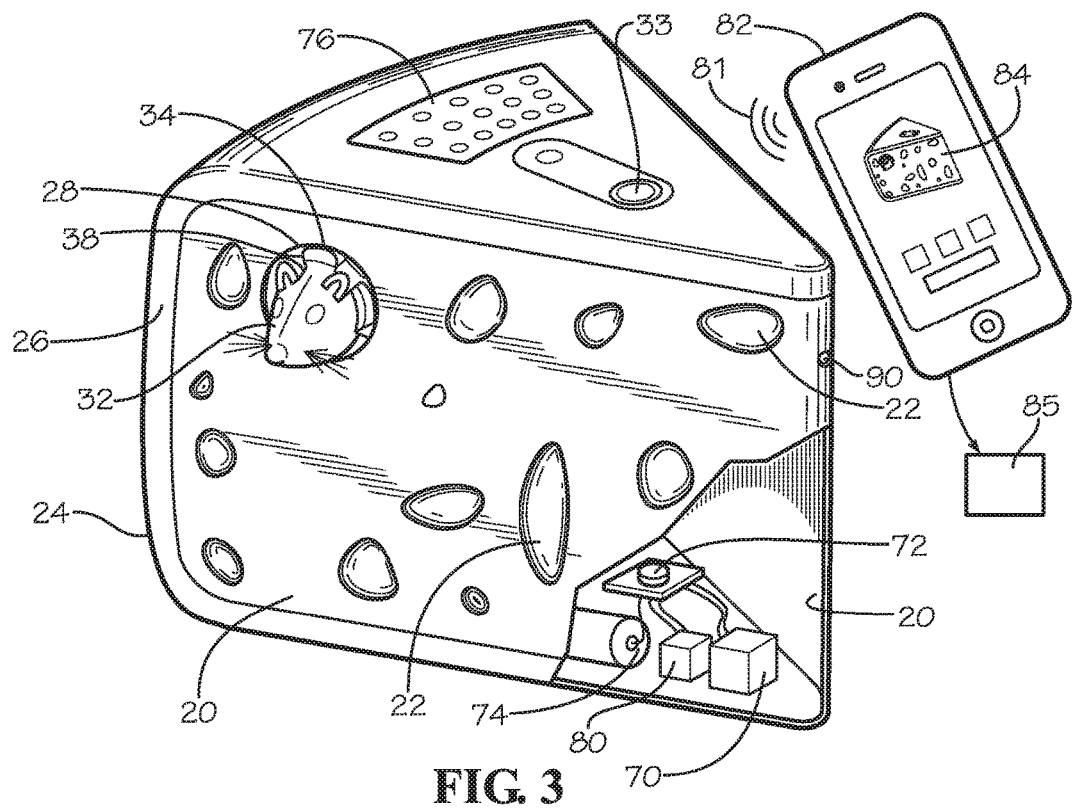
FIG. 3 illustrates in a perspective partially cut-away view the interactive cat toy of FIG. 1 depicting features of an embodiment of the present invention. This view depicts a timer mechanism for communicating with selectively alternate controllers for operation of the cat toy.

FIG. 3 illustrates the cat toy 10 in partial cut-away view to illustrate a timer mechanism 70 operatively connected to the motor 40. The timer mechanism 70 may be a mechanical clock or a processor 72 engaged to a printed circuit board. The printed circuit board includes a preprogrammed Application Specific Integrated Circuit (ASIC) or microprocessor and other discrete electrical components thereon also having a software program. The AISC or microprocessor is configured with software instructions, that upon execution, controls the motor 40 and thus the movement operations of the object of prey 32 within the housing 12 to generate the egress, stays or stops, and return of the object of prey through the opening 18 into the passage 30, as well as an apparent hesitant and curious egress of the object of prey and the darting quickly back into the passage that creates prey-like action for attracting the attention of the cat to engage with the object of prey. A battery 74, received into a battery cavity of the housing 12 through a battery door (best illustrated in FIG. 7) that opens on the bottom surface 18, provides a power source for the circuit board and the motor.

The timer mechanism 70 provides fixed time intervals, random time intervals, or programmed with user-set prescribed time intervals for activity operation of the cat toy 10. The timer mechanism 70 may be manually set, via a keypad 76 mounted to the housing 12 and electrically connected to the timer mechanism 70. In an alternate embodiment, the cat toy 10 includes a transceiver 80 that communicates through a communications system or network 81 with a controller 82 such as a wireless controller device or a microprocessor-equipped mobile communications device or phone (illustrated) configured with an application 84 (schematically illustrated by an image of the cat toy 10 presented on a display) for selective control, programming and operation of the cat toy. The transceiver 80 includes an antenna (not separately shown) to radiate or receive radio waves or other wireless signals.

In the illustrated embodiment, the processor 72 electrically connects to the battery 74 and is in electrical communication with the motor 40. The processor 72 may be configured with software commands that upon execution deliver start and stop signals to the motor 40 in response to the programmed activity schedule, or alternatively, in response to wireless signals sent from the control unit 82 through the transceiver 80 to the processor 72.

In a system that includes the cat toy 10 and the user-operated control unit 82, the control unit offers a user interface configured for programming the cat toy system according to a desired play activity schedule. In one aspect, the user control unit 82 may be integral to the housing 12 and provides a user with an LCD panel for programming play activity. In another aspect as illustrated, the user control unit 82 may be a separate remote control device having a transmitter or a transceiver for sending wireless control signals through the communications system or network 81 to the processor 72. In this instance, the remote control may be a dedicated remote control unit operative in proximity to the cat toy 10 such as through IR signals communicated to an IR signal receiver mounted on the housing 12, and further as discussed below may be a mobile communications device, personal digital assistant, or a general purpose computer that interfaces through a website 85 accessible through a telecommunications network. The control signals may communicate through Blue-Tooth, IR, Zigbee, WiFi, a telecommunications network, or other protocol.

In an alternate embodiment, the cat toy 10 is configured for determining the local presence of the feline and operating the cat toy in response. FIG. 3 further illustrates in one aspect of such configuration a proximity sensor 90 mounted to a surface of the housing 12. The proximity sensor 90 communicates a signal to the processor 72. The proximity sensor 90 may be a visual or IR detector. The proximity sensor 90 detects the presence of the cat local to the cat toy 10, such as sensing a momentary passing by or a dwell period of the presence of the cat for a predetermined time. In a second aspect, cat toy 10 determines the presence of the cat through a collar having a communication device, such as in accordance with the device described in U.S. Pat. No. 8,436,735 entitled "System for Detecting Information Regarding an Animal and Communicating the Information to a Remote Location." The '735 patent is assigned to Radio Systems Corporation and is incorporated herein by reference in its entirety.

With continuing reference to FIG. 3, the controller 82 may be configured with software for selectively setting or scheduling the processor with an operating schedule for operation of the toy. The application executable by the microprocessor of the controller 82 includes control buttons displayed on the screen for selecting and specifying one of a plurality of program schedules. The program schedule includes a button for a drop-down menu to select the day of the week for the particular program schedule (for example, each day of the week, a five-day group (weekdays), a two-day group (weekend), random day, or proximity activation. The program scheduler provides a button to access a screen window configured to set a start time (hour and minute and a.m. or p.m.). The program scheduler may present an operation period (minutes or hours) or alternatively, a select button access a screen window configured to set a stop time (hour and minute and a.m. or p.m.). Multiple operating schedules may be selectively set.

FIG. 4 illustrates in a side elevational view an embodiment of the interactive cat toy 100. In this view, the object of prey 32 is configured with an appearance of a mouse. This view depicts the object of prey 32 extending through the opening 28 of the housing 12. As noted above, each passage 30 includes opposing lower and upper flanges 34 that extend from the inner wall of the passage towards the opposing flange. The opposing slots 36, 28 in the body of the object of prey engage the flanges 34. The flanges 34 define guide tracks for the reciprocating longitudinal movement of the object of prey 32 during operation of the cat toy 10 between the retracted position within the housing 12 and the extended position with a portion of the object of prey 32 outwardly of the housing.

Figure 5:
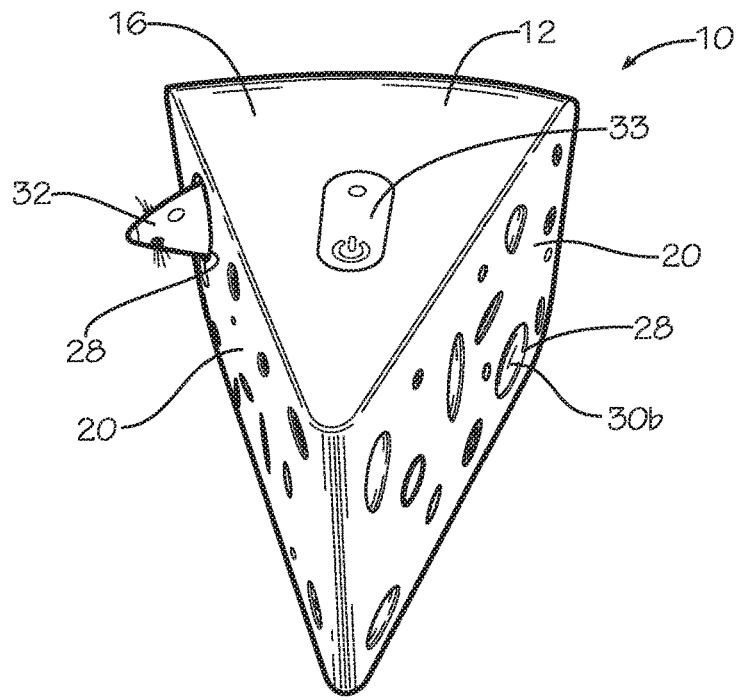
FIG. 5 illustrates in a front narrow edge top perspective view the cat toy illustrated in FIG. 4. This view depicts a mouse as an object of prey extending through an opening in the housing.

FIG. 5 illustrates in a front narrow edge top perspective view the cat toy 10 as shown in FIG. 4. This view depicts a mouse as the object of prey 32 extending through the opening 28 outwardly of the side wall 20 in the housing 12. The object of prey on the opposing side of the cat toy 10 is retracted within the passage 30b in the housing 12.

Figure 6:
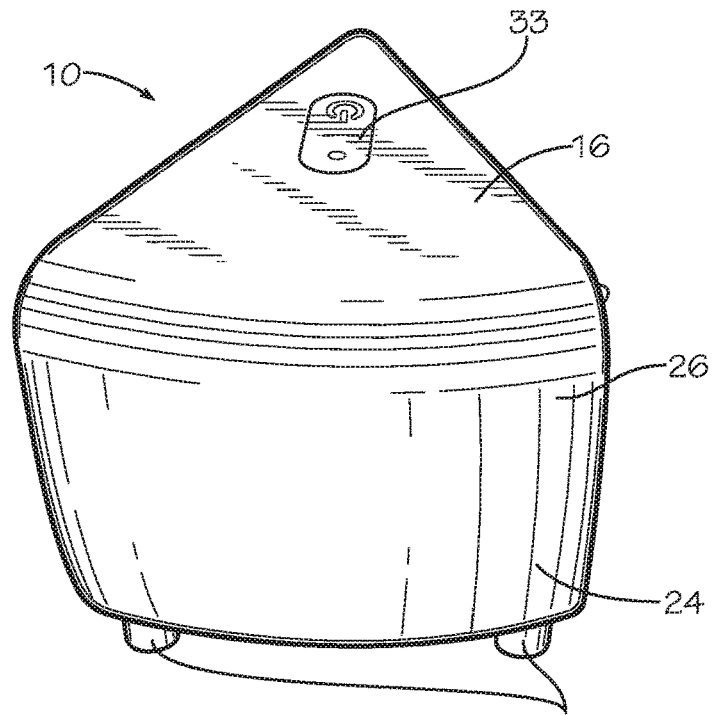
FIG. 6 illustrates in a back top perspective view the cat toy illustrated in FIG. 4. This view depicts two of a plurality of feet depending from the housing for supporting the cat toy on a surface, together with a tip of a nose of the mouse outwardly of the housing on one side.

FIG. 6 illustrates a back top perspective view of the cat toy 10 as shown in FIG. 4. This view depicts two of a plurality of feet 94 extending from the bottom surface 18 of the housing 12 for supporting the cat toy 10 on a surface such as a table or floor.

Figure 7:
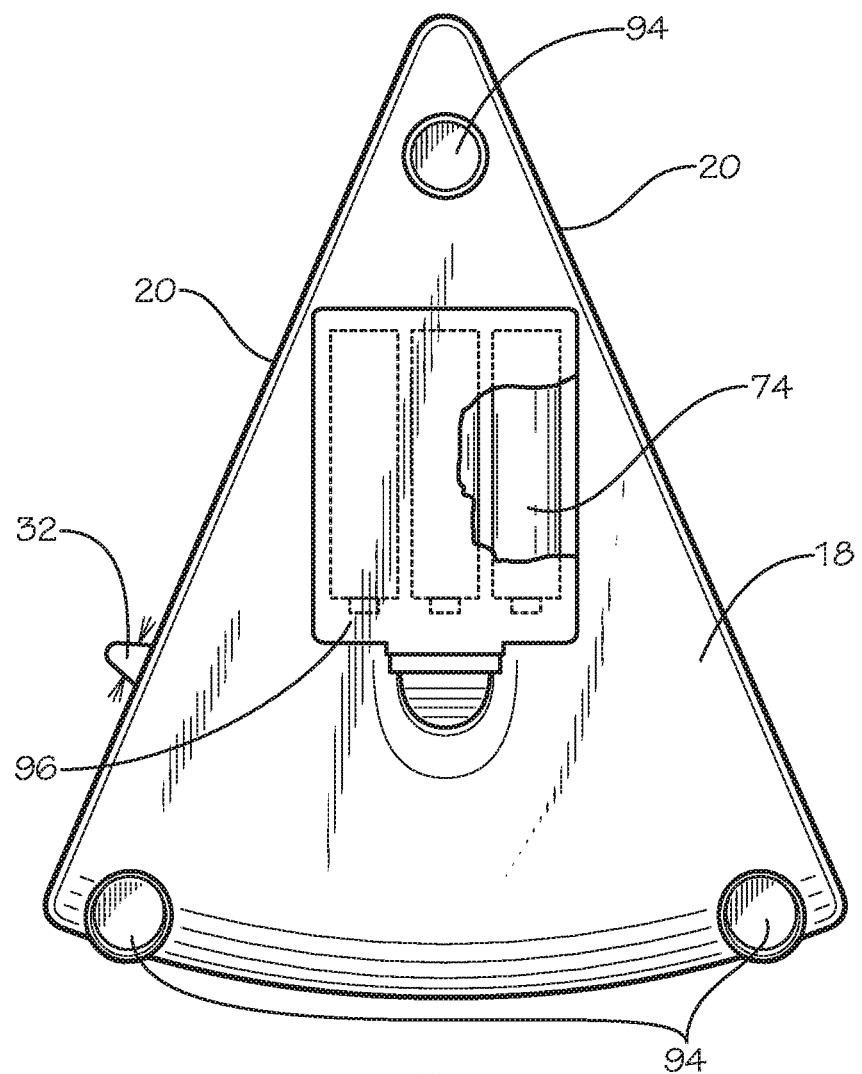
FIG. 7 illustrates in a bottom plan view the cat toy illustrated in FIG. 4. This view depicts the plurality of feet that extend from a bottom surface for supporting the illustrated embodiment of the cat toy and further in the illustrated embodiment a detachable cover for a battery compartment, together with the nose of the mouse outwardly of the housing on one side.

FIG. 7 illustrates a bottom plan view of the cat toy 10 shown in FIG. 4. This view depicts the plurality of the feet 94. This embodiment further includes a detachable cover 96 for a battery compartment within the housing 12 (depicted in cut-away to illustrate batteries 74 within the battery compartment of the housing 12. Such battery compartments and electrical connections thereof are conventional in the battery-operated toy trade). FIG. 7 also illustrates the nose of the mouse as the object of prey 32 outwardly of the housing on one side.

In operation of the cat toy 10, with reference to FIGS. 2 and 2A, the motor 40 being supplied with electrical current increments the crankshaft 48 through the geared transmission 44. The crankshaft 40, thus rotated, moves the arm 56 in a circular path in a vertical plane perpendicular to the longitudinal axis of the crankshaft. The distal end of the arm 56 thereby moves in the circular path sequentially away from and towards the object of prey 32. The link member 58 thereby experiences reciprocating motion. The link member 58, attached to the object of prey 32, moves the object of prey 32 between a recessed position within the housing 12 and an extended position with the object of prey 32 extending through the opening 28 outwardly of the housing. The object of prey 32 moves on the flanges 34 received in the opposing slots 36, 38 as guide tracks. The operating cat toy 10 provides repetitive back-and-forth linear motion to the object of prey 32 to extend out of an opening 28 and, thus, be available to the cat, and sequentially, retract the object of prey 32 inwardly of the housing into the passage 30. As noted above, the other object of prey 32b similarly moves between its respective recessed position and extended position in response to the reciprocating motion of the respective link member connected through the arm to the other crankshaft on the opposing side of the transmission 44. In one aspect, one object of prey 32 may move outwardly while the other object of prey retreats inwardly of the housing 12. The processor 72 selectively controls the flow of, and cessation of flow of, electricity to the motor 40, whereby the object of prey 32 is moved and stopped from moving selectively. Another embodiment includes shaped housings with additional faces, to allow the activity cat toy 10 additional prey shaped figures to move in and out of the housing.

In the illustrated embodiment, the rotation of the crankshaft 40 thereby rotates the attached plate 50. The rotation of the plate 50 in camming action moves the relatively high point (the distal ends 52, 54) and the relatively low point (portion 55) past the roller 68. The roller 62 moving on the camming edge of plate 50 pivots the lever 66 from the remote position to the proximate position relative to the switch 64 and thereby operates the switch.

During operation of the cat toy 10, it is contemplated that the cat responsively jumps to each side, back and forth, as the object of prey 32 moves between the retracted position and the extended position. This activity occupies the cat physically and mentally. The timeframe for operation of the cat toy 10 may be periodic, random or scheduled. When the operation timeframe is concluded or the power button 33 is pressed to stop the operation, the processor 72 retracts the object of prey 32 into the passage 30. The cat toy 10 may be tabletop or floor mounted.

In any of the above aspects, the user may select from any of the following play schedule methods:

(a) random play activity, wherein the controller directs operation of the cat toy 10 at random times and for random periods of time;

(b) scheduled play activity, wherein the user selects designated start and stop times, and may vary such by the day of the week, by 5 day (work week) and 2 day (weekend) schedules, or by 5 day (work week) and 2 separate days (weekend) schedules; and (c) selective spot activity, wherein the user directs the cat toy 10 to commence operation; in an embodiment implemented with an application operative on the mobile communications device 82, the user may communicate with the transceiver 80 of the cat toy 10 for directing operative action.

In one method of operation, the rotation of the crankshaft 48 is intermittent with rotation in a first direction and a stop of rotation, followed by another sequence of rotation and stop. The rotation of the crankshaft 44 causes the object of prey 32 to move, and pause, before moving again. Further, the rotation of the crankshaft 48 after a stop may be made in a second direction in reversal of the first direction. In such operation, the initial movement preferably moves the object of prey 32 from the recessed position inwardly of the housing 12 to an intermediate position at least partially outwardly of the opening 28 in the housing. A subsequent reversal of the rotation of the crankshaft 48 causes the object of prey 32 to return inwardly of the housing 12. Further, in an alternate embodiment, the motor 40 operates at first revolutions per minute (RPM) in the first direction and a second revolutions per minute (RPM) in the second direction, the first RPM less than the second RPM. Such process of movement of the object of prey 32, stopping, and reverse movement, replicates a cautious investigatory egress by mouse from a hole, with the reversal of motion representing a darting back into the hole, before again making a reappearance. The cat, observing the movement of the object of prey 32 relative to the housing 12, may begin interacting with the cat toy 10 in an effort to catch the object of prey. In embodiments having objects of prey 32 that move outwardly on different sides, the cat may jump back and forth to each side. This activity occupies and consumes the cat physically and mentally.

In other aspects of the operation of the cat toy 10, the object of prey 32 may move slowly from the opening 28 to the extended position. The egress movement of the object of prey 32 may be hesitant, such as starting and stopping, in simulation of actions of actual objects of prey exiting a safety hole but cautiously searching and alert to local hunter threats. The return motion of the object of prey 32 similarly may be darting and quick, again simulating retreat or safety-seeking action of a prey that becomes scared or apprehensive of the presence of a hunter. Further, the operation sequence may include a dwell time for the object of prey 32 to occupy an intermediate position without movement. Such operations of the object of prey attracts the attention of the cat, for play, exercise, and mental stimulation, assisting with resolving separating anxiety, and adding just plain fun in to the experience of the cat. The operative movement of the object of prey may be periodic, random, or timed, and the cat toy 10 may provide more than one objects of prey of various shapes that extend outwardly and retract.

The user control unit 82 in the illustrated embodiment represents a mobile communications devices generally referred to in the trade as a smart phone or a personal digital assistant. The user control device 82 includes a display that serves as a user interface. Examples of a suitable mobile communications device include the iPhone® from Apple, Inc. of Cupertino, Calif., the Samsung® Galaxy of Samsung Electronics Co., Ltd. of the Republic of Korea, and the Droid RAZR® provided by Motorola, Inc. of Schaumburg, Ill. (It is acknowledged that Motorola, Inc. (or its telecommunications-related assets) may now be owned by Google, Inc. and that trademarks are likely owned by a trademark (or other IP) holding company out of Cerritos, Calif.)

An alternate embodiment of the user control unit 82 is a so-called tablet computer. The tablet similarly includes a display that serves as user interface. Examples of a suitable tablet computer include the iPad® tablet available from Apple, Inc., the Google® Nexus tablet, the Samsung® Galaxy tablet, the Amazon® Kindle Fire tablet, the Lenovo® ThinkPad tablet, and the Microsoft® Surface tablet. Tablets are also considered personal digital assistants.

An alternate embodiment of the user control unit 82 is a general purpose microprocessor-based computer. The computer also includes a display that may serve as a user interface, together with other common input devices such as a keyboard and/or pointer/selector device commonly referenced as a mouse. General purpose computers may include the iMac® computer available from Apple, Inc., the Connectbook™ computer available from Hewlett-Packard Development Company, L.P. of Houston, Tex., the Inspiron® computer from Dell Computer Corporation of Round Rock, Tex., and the ATIV® computer from Samsung Electronics Co., Ltd.

Where a mobile computer device, personal digital assistant or a tablet is used as the processor, a dedicated software application, or "App" will need to be uploaded. Where a general purpose computer is used as the processor, a software package may be downloaded from the Internet or uploaded from a so-called thumb drive or other device having memory. More preferably, a web-based application is used.

In any of the remote devices, a wireless signal is sent to the transceiver 80 capable of receiving wireless signals. Such signals are preferably cellular-based signals sent through a wireless telecommunications network. However, other communications protocols may be used such as a co-axial cable connection through a so-called cable subscription or satellite service. Alternatively, a traditional land-based telephone line may be used.

The housing 12 may take various shapes, such as cat interest related, including the wedge-shaped cheese in the illustrative embodiment, a square or rectangular block of cheese, a tube, or other irregular shaped housing such as may simulate a location having prey for cats. The housing may be portable, for selective positioning and use in different room environments.

It is to be appreciated that while the foregoing illustrates and discloses the present invention as to particular embodiments of the invention, various changes may be made by one of skill in the art based on a reading of the disclosure in the cat toy device, construction thereof, and arrangement of the parts therein, and in the operation and process of selectively moving objects of prey in simulation of actual objects of prey of interest to a hunter animal, without sacrificing any of its advantages. Therefore, it is to be understood that all matter herein is to be interpreted as illustrative and not in any limiting sense, and it is intended to cover in the appended claims such modifications as come within the spirit and scope of the invention.

We claim:

1. An interactive cat toy, comprising:
   a housing fabricated from a durable material, the housing have at least one opening for a passageway to a respective side of the housing;
   an object of prey associated with each opening of the at least one opening, the object of prey dimensioned to be received within a corresponding passageway for moving relative to a respective opening;
   a motor operatively coupled to the object of prey and communicating with a supply of an electrical current for moving the object of prey between a recessed position within the housing and an extended position outwardly of the housing through the respective opening;

a controller for receiving an operational schedule for operation of the motor, wherein the controller is communicatively coupled to a processor;

the processor configured to receive the operational schedule from the controller and to control delivery and cessation of electrical current to the motor according to the operational schedule, wherein the motor in operation is configured to move the object of prey relative to the opening.

2. The interactive cat toy as recited in claim 1, wherein the motor connects to a crankshaft having an arm at a distal end that rotates in a plane perpendicular to a longitudinal axis of the crankshaft, the arm connected to a link attached to the object of prey, whereby rotation of the crankshaft by the motor moves the object of prey relative to the opening in the housing.

3. The interactive cat toy as recited in claim 1, the processor comprising a transceiver for receiving the operational schedule through wireless communications.

4. The interactive cat toy as recited in claim 1, wherein the controller comprises one or more applications running on at least one processor.

5. The interactive cat toy as recited in claim 4, wherein the controller is remote from the housing.

6. The interactive cat toy as recited in claim 1, further comprising a proximity sensor operative for detecting a presence of a cat and in response to the detecting for moving the object of prey according to the operational schedule.

7. The interactive cat toy as recited claim 1, wherein the motor operates to rotate a crankshaft.

8. The interactive cat toy as recited in claim 7, further comprising
a cam plate attached to the crankshaft for rotation by the motor.

9. The interactive cat toy as recited in claim 8, wherein a switch comprises a pivot lever and a roller at a distal free end thereof, the lever pivoting between a first position and a second position in response to the roller traveling on the cam plate, the switch causing a control circuit to stop the supply of the electrical current to the motor momentarily upon the lever moving to the first position.

10. The interactive cat toy as recited in claim 1, wherein the operational schedule includes movement of the object of prey in a first direction, cessation of the object of prey from movement, and movement the object of prey in a second direction opposing the first direction, whereby the object of prey moves in the first direction relative to the housing, stops, and moves in the second direction relative to the housing.

11. The interactive cat toy as recited in claim 1, wherein the operational schedule further comprises a speed and a direction of movement of the object of prey.

12. The interactive cat toy as recited in claim 1, wherein the operational schedule further comprises a dwell time for the object of prey to occupy an intermediate position without movement.

13. The interactive cat toy as recited in claim 1, wherein the operational schedule comprises operation of the motor at a random time.

14. The interactive cat toy as recited in claim 1, wherein the operational schedule comprises operation of the motor for a random period of time.

15. The interactive cat toy as recited in claim 1, wherein the operational schedule comprises operation of the motor to move the object of prey during a period having a selected start time and a selected stop time.

16. The interactive cat toy as recited in claim 1, wherein the operational schedule comprises operation of the motor to move the object of prey according to a plurality of sets of a start time and a stop time, each set associated with at least one day of a week.

17. A method of entertaining an animal, the method comprising:
disposing an object of prey within a passageway of a housing which passageway has a through opening in a side thereof;
linking a motor to the object of prey;
receiving an operational schedule from a controller, wherein the operational schedule comprises operational time of the motor;
operating a motor to move the object of prey between a recessed position within the passage of the housing and an extended position through the opening outwardly of the housing,
whereby the motor, being operated, moves the object of prey relative to the opening according to the operational schedule.

18. The method of entertaining an animal as recited in claim 17, wherein the operational schedule comprises operation of the motor at a random time.

19. The method of entertaining an animal as recited in claim 17, wherein the operational schedule comprises operation of the motor for a random period of time.

20. The method of entertaining an animal as recited in claim 17, wherein the operational schedule comprises moving the object of prey according to a plurality of sets of a start time and a stop time, each set is associated with at least one day of a week.

21. The method of entertaining an animal as recited in claim 17, further comprising
detecting a feline proximate the housing, the detecting including moving the object of prey according to the operational schedule.

22. The method of entertaining an animal as recited claim 17, wherein the operating comprises at least one of rotating a crankshaft in a first direction, stopping the rotation, and rotating the crankshaft in a second direction.

23. The method of entertaining an animal as recited in claim 22, wherein the motor operates at a first RPM in the first direction and a second RPM in the second direction, wherein the first RPM is less than the second RPM.

* * * * *